United States Patent
Kang

(10) Patent No.: US 10,090,508 B2
(45) Date of Patent: Oct. 2, 2018

(54) CURRENT BREAKING STRUCTURE OF BATTERY SYSTEM

(71) Applicant: HYUNDAI MOTOR COMPANY, Seoul (KR)

(72) Inventor: Min Kyeong Kang, Daejeon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 192 days.

(21) Appl. No.: 14/861,584

(22) Filed: Sep. 22, 2015

(65) Prior Publication Data

US 2016/0149197 A1  May 26, 2016

(30) Foreign Application Priority Data

Nov. 25, 2014 (KR) ........................ 10-2014-0165616

(51) Int. Cl.
*H01M 2/34* (2006.01)
*H01M 2/02* (2006.01)

(52) U.S. Cl.
CPC .......... *H01M 2/345* (2013.01); *H01M 2/0275* (2013.01); *H01M 2200/20* (2013.01); *H01M 2220/20* (2013.01)

(58) Field of Classification Search
None
See application file for complete search history.

(56) References Cited

U.S. PATENT DOCUMENTS

| 9,136,521 | B2 | 9/2015 | Lee et al. | |
|---|---|---|---|---|
| 2004/0106038 | A1* | 6/2004 | Shimamura | H01M 2/021 429/152 |
| 2005/0077878 | A1* | 4/2005 | Carrier | B25F 5/00 320/134 |
| 2008/0220324 | A1* | 9/2008 | Phillips | B25F 5/02 429/120 |
| 2012/0107678 | A1 | 5/2012 | Kim et al. | |
| 2013/0330595 | A1 | 12/2013 | Lee et al. | |
| 2014/0062418 | A1 | 3/2014 | Lim | |
| 2014/0255750 | A1* | 9/2014 | Jan | H01M 2/206 429/120 |

FOREIGN PATENT DOCUMENTS

| KR | 10-2010-0081942 A | 7/2010 |
|---|---|---|
| KR | 10-2012-0121346 A | 11/2012 |

(Continued)

*Primary Examiner* — Ula C Ruddock
*Assistant Examiner* — Tony S Chuo
(74) *Attorney, Agent, or Firm* — McDermott Will & Emery LLP

(57) ABSTRACT

A current breaking structure of a battery system includes lead wires, which extend from a plurality of battery cells connected in parallel with each other. The lead wires are bonded to one of two faces of an outer busbar that connect a battery module to outside, in which the one of the two faces is faced to an interior of a battery module, such that upon battery cell expansion, the lead wires are entirely broken by the outer busbar. Accordingly, in case where overcharge occurs in a pouch type lithium ion battery, i.e., in a high-voltage battery having battery cells in parallel connection and then serial connection, connecting structure is broken effectively, thus preventing in advance overcharge-related safety accident.

6 Claims, 9 Drawing Sheets

(56) References Cited

FOREIGN PATENT DOCUMENTS

| KR | 10-2013-0113145 A | 10/2013 |
|----|-------------------|---------|
| KR | 10-1330614 B1 | 11/2013 |
| KR | 10-2014-0012264 A | 2/2014 |
| KR | 10-2014-0032165 A | 3/2014 |
| KR | 10-2014-0084560 A | 7/2014 |

* cited by examiner

CURRENT BREAKING STRUCTURE OF BATTERY SYSTEM

CROSS-REFERENCE TO RELATED APPLICATION

This application is based on and claims the benefit of priority to Korean Patent Application No. 10-2014-0165616, filed on Nov. 25, 2014 in the Korean Intellectual Property Office, the disclosure of which is incorporated herein in its entirety by reference.

TECHNICAL FIELD

The present disclosure relates to a current breaking structure of a battery system, and more particularly, to a current breaking structure of a battery system configured to ensure safety in case of overcharge of a large-capacity, high-voltage battery which has increased capacity by connecting battery cells in parallel and connecting these in series.

BACKGROUND

Generally, compared with a general passenger hybrid vehicle, an industrial hybrid vehicle carrying freight uses relatively large currents. The industrial hybrid vehicle thus employs lithium ion batteries to increase battery performance and durability. To be more specific, the industrial hybrid vehicle employs batteries in which battery cells are connected in parallel to increase capacity and then connected in series.

However, in order to break currents in the parallel-connected battery cells, it is necessary to cut all the lead wires to the battery cells in parallel connection. Accordingly, compared with the passenger hybrid vehicle in which battery cells are simply connected in series, it is difficult to provide current breaking structure for the industrial hybrid vehicle.

SUMMARY

The present disclosure has been made to solve the above-mentioned problems occurring in the prior art while advantages achieved by the prior art are maintained intact.

An aspect of the present disclosure provides a current breaking structure of a battery system configured to prevent in advance the safety accident of a high-voltage battery in an eco-friendly vehicles such as electric vehicle, hybrid vehicle, fuel cell vehicle, etc., from occurring due to overcharge, by disconnecting the high-voltage battery from outside as the high-voltage battery is over-charged, using expansion phenomenon generated at the lithium ion battery, i.e., battery cells.

According to an exemplary embodiment of the present disclosure, there is provided a current breaking structure of a battery system, in which lead wires, which are extended from a plurality of battery cells connected in parallel with each other, are bonded to one of two faces of an outer busbar that is connecting a battery module to outside, in which the one of the two faces is faced to an interior of a battery module, such that upon battery cell expansion, the lead wires are entirely broken by the outer busbar.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
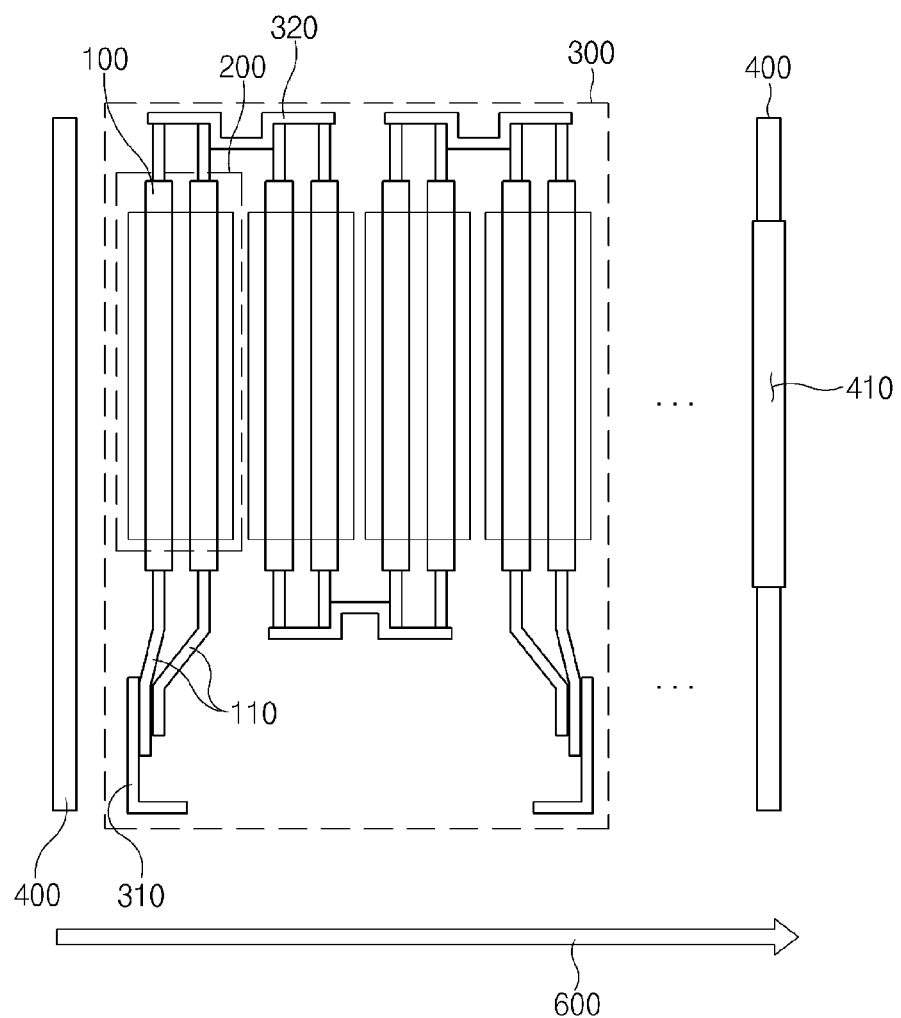
FIG. 1 is a schematic view of a current breaking structure of a battery system according to an exemplary embodiment of the present disclosure.

An exemplary embodiment of the present disclosure will be described in detail with reference to the accompanying drawings.

As illustrated in FIGS. 1 to 9, a current breaking structure of a battery system according to an exemplary embodiment of the present disclosure includes a unit 200 including a plurality of battery cells 100 connected in parallel, and a battery module 300 including a plurality of units 200 arranged horizontally and connected in series, in which a plurality of lead wires 110, which extend from a plurality of battery cells 100 included in the outermost unit 200 of the plurality of units 200, are bonded to one of two faces of an outer busbar 310 which connects the battery module 300 to outside, i.e., to one face toward interior of the battery module 300.

The battery module 300 includes a plurality of inter busbars 320 configured to connect a plurality of units 200 in series. That is, referring to FIGS. 1 and 2, and 7, a plurality of units 200 are arranged horizontally and adjacent units 200 are connected in series with each other via the inter busbars 320. The outer busbar 310 is then connected to the outermost unit 200 among a plurality of units 200 to thus connect the plurality of the units 200, which are connected in serial by the inter busbars 320, to outside.

Figure 2:
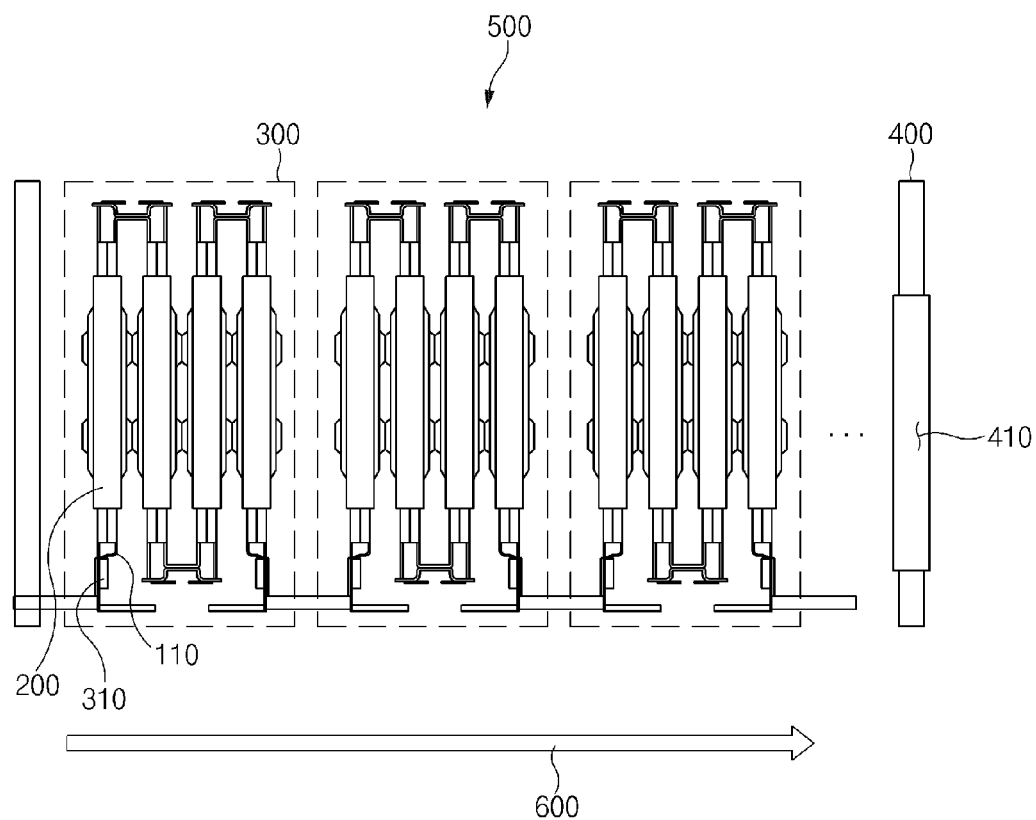
FIG. 2 is another schematic view of the current breaking structure of the battery system of FIG. 1.
Figure 3:
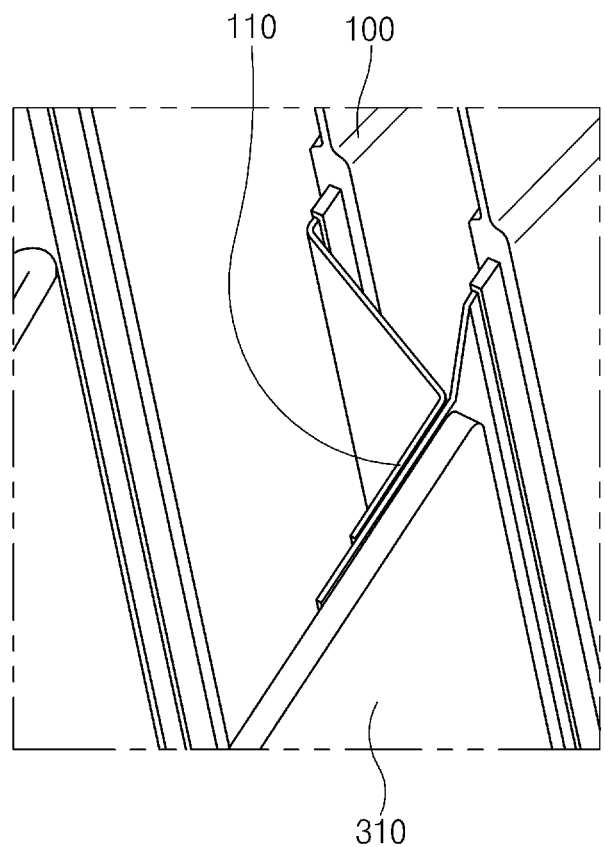
FIG. 3 is a perspective view illustrating main portion of the current breaking structure of the battery system of FIG. 1.
Figure 4:
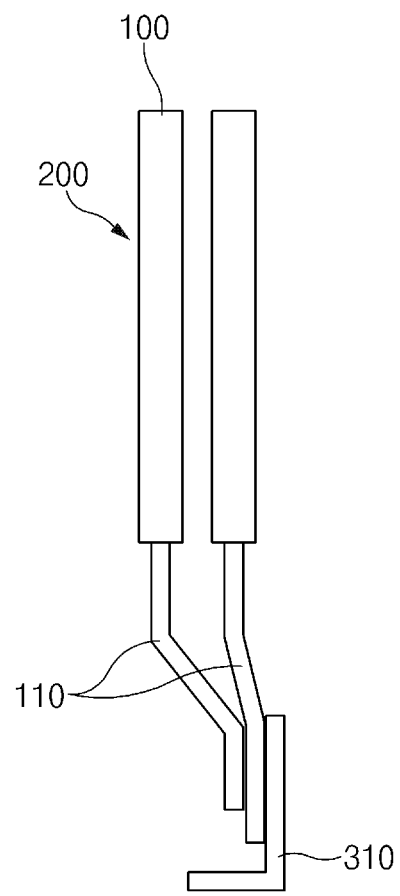
FIG. 4 is a cross-section view illustrating a main portion of the current breaking structure of the battery system of FIG. 1.
Figure 5:
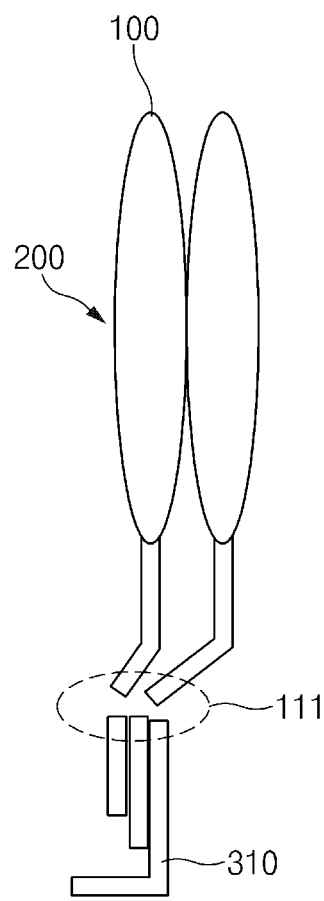
FIG. 5 is another cross-section view illustrating the main portion of the current breaking structure of the battery system of FIG. 1.

According to an exemplary embodiment of the present disclosure, end plates 400 are additionally provided. The end plates 400 are made from a material that does not deform when the battery cells 100 expand. According to an exemplary embodiment of the present disclosure, a plurality of battery modules 300, arranged horizontally, are connected in series to form a battery pack 500, as illustrated in FIGS. 2 and 8.

Figure 8:
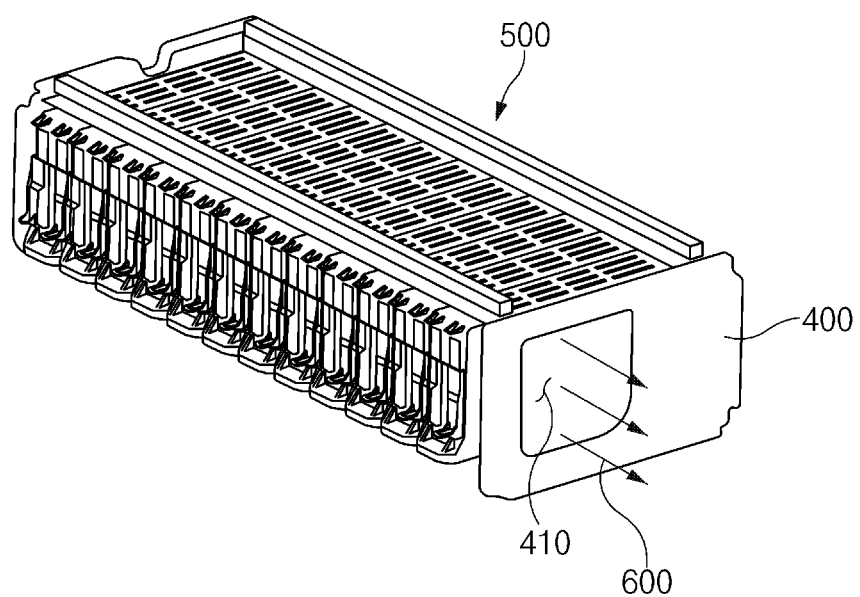
FIG. 8 is a perspective view of a battery pack of the current breaking structure of the battery system of FIG. 1.
Figure 9:
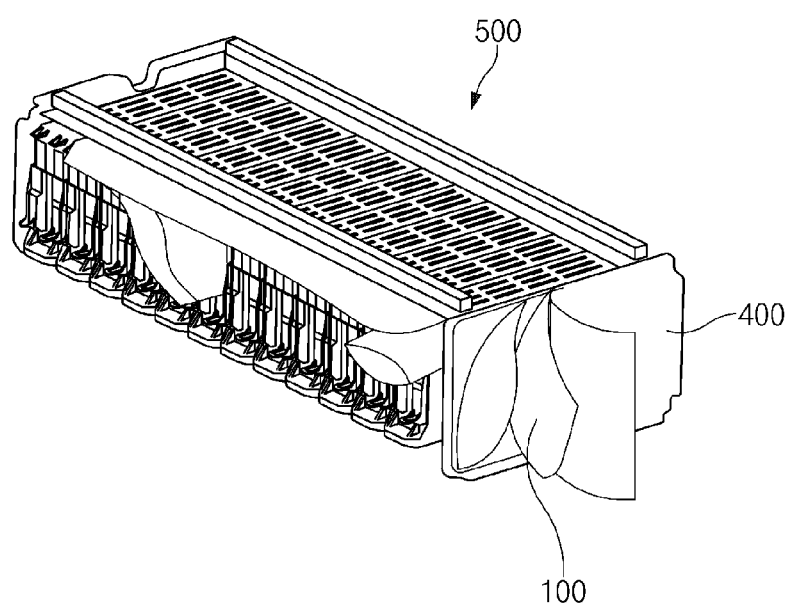
FIG. 9 is another perspective of the battery pack of the current breaking structure of the battery system of FIG. 1.

Referring to FIGS. 8 and 9, the end plates 400 are mounted on only the outermost battery modules 300 which are positioned at the outermost sides to form both end faces of the battery pack 500. That is, the end plates 400 are provided on both ends of the battery pack 500 in a length direction. A cell discharge opening 410 is formed on one of the end plates 400 to open interior of the battery module 300 to outside.

When the battery cells 100 expand, the presence of the end plate 400 and the cell discharge opening 410 causes the expanding force 600 to be focused toward one face of the battery pack 500, or to be more specific, focused toward the end plate 400 with the cell discharge opening 410 formed thereon. The expanding force 600 focused toward the end plate 400 causes breakage of the lead wires 110 which extend from the units 200 and bonded to one face of the outer busbar 310 that is faced toward the interior of the battery module 300. At this time, the outer busbar 310, which has a relatively higher rigidity compared to the lead wires 110, does not deform.

Figure 6:
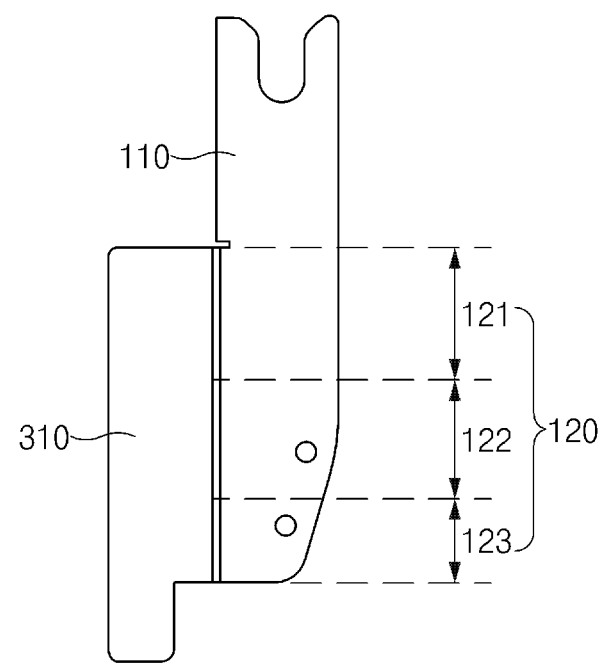
FIG. 6 is yet another cross-section view illustrating the main portion of the current breaking structure of the battery system of FIG. 1.
Figure 7:
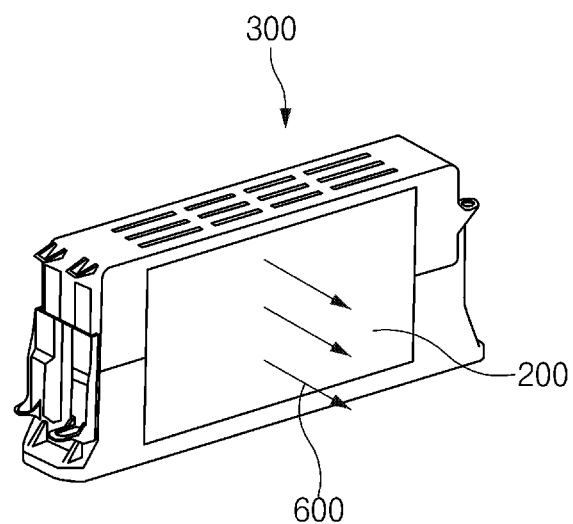
FIG. 7 is a perspective view of a battery module of the current breaking structure of the battery system of FIG. 1.

Referring to FIG. 6, the outer busbar 310 and the lead wires 110 are partially bonded to each other, thus leaving some un-bonded portions on a contact area 120. The contact area 120 is divided along a height direction, into a first region 121 adjacent to the battery cells 100, a third region 123 far away from the battery cells 100, and a second region 122 positioned between the first and second regions 121, 122.

The second region 122 may desirably be formed to be un-bonded region, and it is also desirable that the height of the first region 121 be seven to eight times greater than height of the third region 123. By doing so, the third region 123 will break first, thus causing the expansion force 600 to be focused to the first region 121. Because the expansion force 600 is focused to the first region 121, a breakage indicator 111 of the lead wires 110 adjacent to the first region 121 is more apt to break.

As described above, according to exemplary embodiments of the present disclosure, a current breaking structure of a battery system is provided so that when a high-voltage battery employing pouch type lithium ion batteries, i.e., battery cells connected in parallel and then in series, the current breaking structure provides an effect of preventing overcharge-related safety accident in case the high-voltage battery is overcharged, by effectively breaking a connecting structure. That is, because portions of busbars and leadwires for welding are adjusted in consideration of a direction of battery cell expansion, it is possible to effectively break the connecting structure in the event of overcharge.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A battery system, comprising:
a battery module including a plurality of units which are arranged horizontally and connected in series, each of the plurality of units including a plurality of battery cells that are connected in parallel with each other;
end plates disposed on both ends of the battery module, respectively;
an outer busbar fixed in place with a space between an outermost unit among the plurality of units and the end plates; and
a plurality of lead wires extending from battery cells included in the outermost unit of the plurality of units, and bonded onto one of two faces of the outer busbar connecting the battery module to outside, in which the one of the two faces of the outer busbar faces toward an interior of the battery module, such that the plurality of lead wires are entirely broken by the outer busbar upon battery cell expansion,
wherein the outer busbar has a higher rigidity than the lead wires,
wherein the outer busbar and the lead wires are partially bonded to each other such that a contacting portion between the outer busbar and the lead wires has an un-bonded portion,
wherein the contacting portion is divided, along a height direction, into a first region adjacent to the plurality of battery cells, a third region far away from the plurality of battery cells, and a second region positioned between the first and third regions, wherein the second region is the un-bonded portion, and
wherein the first region has an area greater than that of the third region.

2. The battery system according to claim 1, wherein the battery module includes a plurality of inter busbars configured to connect the plurality of units with each other in series.

3. The battery system according to claim 1, wherein a plurality of the battery modules are arranged horizontally and connected in series with each other to form a battery pack, and the end plates are exclusively mounted on one or more outermost battery modules that are positioned on sides of the outermost battery module among the plurality of battery modules, to thus form sides of the battery pack.

4. The battery system according to claim 1, wherein one of the end plates includes a cell discharge opening to open the interior of the battery modules to outside.

5. A current breaking structure of a battery system, wherein, lead wires, which extend from a plurality of battery cells connected in parallel with each other, are bonded to one of two faces of an outer busbar that connects a battery module to outside, in which the one of the two faces is faced to an interior of the battery module, such that upon battery cell expansion, the lead wires are entirely broken by the outer busbar,
wherein the battery module includes a plurality of units which are arranged horizontally and connected in a series, each of the plurality of units including the plurality of battery cells that are connected in parallel with each other,
wherein end plates are disposed on both ends of the battery module,
wherein the outer busbar is connected to an outermost unit among the plurality of units in a space between the end plates,
wherein the outer busbar has a higher rigidity than the lead wires,
wherein the outer busbar and the lead wires are partially bonded to each other such that a contacting portion between the outer busbar and the lead wires has an un-bonded portion,
wherein the contacting portion is divided, along a height direction, into a first region adjacent to the plurality of battery cells, a third region far away from the plurality of battery cells, and a second region positioned between the first and third regions, wherein the second region is the un-bonded portion, and
wherein the first region has an area greater than that of the third region.

6. The current breaking structure according to claim 5, wherein one of the end plates includes a cell discharge opening to open the battery cell to outside.

* * * * *